US012790169B2

(12) United States Patent
Martin et al.

(10) Patent No.: US 12,790,169 B2
(45) Date of Patent: Nov. 10, 2026

(54) ELEVATOR PLATFORM LOCKING SYSTEMS

(71) Applicant: Otis Elevator Company, Farmington, CT (US)

(72) Inventors: Kyle B. Martin, Avon, CT (US); Kyle Connolly, Newington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 19/045,060

(22) Filed: Feb. 4, 2025

(65) Prior Publication Data

US 2026/0225850 A1 Aug. 6, 2026

(51) Int. Cl.
*B66B 1/44* (2006.01)
*B66B 1/36* (2006.01)

(52) U.S. Cl.
CPC ................ *B66B 1/44* (2013.01); *B66B 1/365* (2013.01)

(58) Field of Classification Search
CPC .................................. B66B 1/365; B66B 1/44
See application file for complete search history.

(56) References Cited

FOREIGN PATENT DOCUMENTS

| | | | | | |
|---|---|---|---|---|---|
| CN | 1154941 | A | * | 7/1997 | |
| CN | 204022160 | U | * | 12/2014 | |
| CN | 214031315 | U | * | 8/2021 | |
| JP | H05338959 | A | * | 12/1993 | |
| KR | 101564880 | B1 | * | 10/2015 | ............... B66B 1/42 |
| KR | 102038516 | B1 | * | 10/2019 | ......... B66B 11/0293 |
| KR | 102182983 | B1 | * | 11/2020 | ............. B66B 17/34 |
| KR | 102566204 | B1 | * | 8/2023 | ............. B66B 1/365 |
| KR | 20230132269 | A | * | 9/2023 | ............... B66B 1/40 |

OTHER PUBLICATIONS

Machine Translation of KR 10-2182983.*
Machine Translation of KR 10-1564880.*

* cited by examiner

*Primary Examiner* — Diem M Tran
(74) *Attorney, Agent, or Firm* — CANTOR COLBURN LLP

(57) ABSTRACT

Elevator systems include an elevator car arranged to travel in an elevator shaft between a plurality of landings. A platform locking system includes a car portion arranged on the elevator car that includes a coupling assembly and a landing portion arranged at a landing, the landing portion arranged along the elevator shaft and having a socket. The coupling assembly is configured to selectively engage with the socket at the landing to securely couple the elevator car to the elevator shaft. In a coupled state, the elevator car is prevented from vertical motion. The coupling assembly is configured to selectively disengage from the socket at the landing to decouple the elevator car from the elevator shaft. In a decoupled state the elevator car is free to travel within the elevator shaft.

20 Claims, 15 Drawing Sheets

ELEVATOR PLATFORM LOCKING SYSTEMS

BACKGROUND

The subject matter disclosed herein generally relates to elevator systems and, more particularly, to elevator car and elevator platform locking devices and systems.

Elevator systems may be used to carry loads between landings of a building. The loads may be very high, and as such loads are loaded or unloaded from the elevator car, the elevator car may be prone to travel due to adding or removing the load. One such type of high-load elevators is a vehicle or automobile elevator. Vehicle elevators are commonly used in multi-level parking structures, car showrooms, and automotive service centers to move vehicles between floors. These systems are essential for optimizing space utilization in urban environments where horizontal space is limited. By enabling vertical transportation of vehicles, these elevators help in maximizing the number of vehicles that can be accommodated within a given footprint.

Traditional vehicle elevators often face challenges related to load balancing, safety, and operational efficiency. The weight of vehicles can vary significantly, and the elevator system must be capable of handling these variations without compromising safety or performance. Additionally, the process of loading and unloading vehicles must be smooth and secure to prevent damage to the vehicles and ensure the safety of operators and passengers. Another challenge is the alignment of the elevator platform with the landing levels. Misalignment can lead to difficulties in driving vehicles on and off the platform, potentially causing damage to the vehicle or the elevator system. Therefore, precise control mechanisms and robust locking systems are required to maintain the platform in a stable and level position during loading and unloading operations.

SUMMARY

According to some embodiments, elevator systems are provided. The elevator systems include an elevator car arranged to travel in an elevator shaft between a plurality of landings and a platform locking system. The platform locking system includes a car portion arranged on the elevator car, the car portion having a coupling assembly and a landing portion arranged at a first landing of the plurality of landings, the landing portion arranged along the elevator shaft and having a socket. The coupling assembly is configured to selectively engage with the socket at the first landing to securely couple the elevator car to the elevator shaft, wherein in a coupled state the elevator car is prevented from vertical motion, and the coupling assembly is configured to selectively disengage from the socket at the first landing to decouple the elevator car from the elevator shaft, wherein in a decoupled state the elevator car is free to travel within the elevator shaft.

In addition to one or more of the features described above, or as an alternative, further embodiments of the elevator systems may include that each landing of the plurality of landings comprises a respective landing portion having a respective socket, wherein the coupling assembly of the elevator car is configured to selectively couple and decouple from each of the plurality of sockets.

In addition to one or more of the features described above, or as an alternative, further embodiments of the elevator systems may include that the landing portion comprises a plurality of sockets and the car portion comprises a plurality of coupling assemblies, wherein each coupling assembly is configured to selectively couple with a respective socket of the plurality of sockets.

In addition to one or more of the features described above, or as an alternative, further embodiments of the elevator systems may include that the socket comprises one or more socket ramps configured to urge at least a part of the coupling assembly into a socket cavity defined by the socket.

In addition to one or more of the features described above, or as an alternative, further embodiments of the elevator systems may include that the car portion comprises a support arm, wherein the coupling assembly is arranged at an end of the support arm.

In addition to one or more of the features described above, or as an alternative, further embodiments of the elevator systems may include that the support art is movably supported on a mounting bracket, wherein the mounting bracket is securely attached to the elevator car.

In addition to one or more of the features described above, or as an alternative, further embodiments of the elevator systems may include that the mounting bracket comprises at least one support track and the support arm comprises at least one roller configured to travel along the at least one support track.

In addition to one or more of the features described above, or as an alternative, further embodiments of the elevator systems may include a linear actuator configured to selectively drive movement of the support arm to couple or decouple the coupling assembly to or from the socket.

In addition to one or more of the features described above, or as an alternative, further embodiments of the elevator systems may include that the coupling assembly includes a support arm, a hydraulic cylinder supported at an end of the support arm, and a movable element operably connected to the hydraulic cylinder, wherein the movable element is configured to move relative to the support arm during coupling and decoupling of the coupling assembly with the socket.

In addition to one or more of the features described above, or as an alternative, further embodiments of the elevator systems may include that when the movable element is seated within the socket, the hydraulic cylinder is selectively locked to prevent movement of the movable element.

In addition to one or more of the features described above, or as an alternative, further embodiments of the elevator systems may include that the hydraulic cylinder includes a housing, a piston arranged within the housing, and separating the hydraulic cylinder into a first chamber and a second chamber, a working fluid contained within the first chamber and the second chamber, and a flow path fluidly coupling the first chamber to the second chamber.

In addition to one or more of the features described above, or as an alternative, further embodiments of the elevator systems may include a flow controller arranged along the flow path, the flow controller configured to selectively control flow between the first chamber and the second chamber.

In addition to one or more of the features described above, or as an alternative, further embodiments of the elevator systems may include that the flow controller is configured to prevent flow between the first chamber and the second chamber when the movable element is seated within the socket.

In addition to one or more of the features described above, or as an alternative, further embodiments of the elevator systems may include that the movable element comprises one or more ramps configured to urge the movable element to seat within the socket.

In addition to one or more of the features described above, or as an alternative, further embodiments of the elevator systems may include an elevator controller, wherein the elevator controller is configured to selectively control operation of the platform locking system.

In addition to one or more of the features described above, or as an alternative, further embodiments of the elevator systems may include at least one sensor assembly arranged to detect engagement between the car portion and the landing portion.

In addition to one or more of the features described above, or as an alternative, further embodiments of the elevator systems may include at least one sensor assembly arranged to detect proximity of the car portion and the landing portion.

In addition to one or more of the features described above, or as an alternative, further embodiments of the elevator systems may include at least one sensor assembly arranged to monitor a hydraulic pressure within the platform locking system.

In addition to one or more of the features described above, or as an alternative, further embodiments of the elevator systems may include that the car portion is arranged on a bottom of the elevator car below a car sill and the landing portion is arranged beneath a landing sill of the first landing.

According to some embodiments, methods of operating elevator systems are provided. The elevator systems include an elevator car, at least one landing, and a platform locking system having a car portion having a coupling assembly on the elevator car and a landing portion having a socket at the at least one landing. The methods include moving the elevator car to the at least one landing, deploying at least a part of the coupling assembly of the car portion to engage with the socket of the landing portion, engaging the coupling assembly into a fixed coupling with the socket, disengaging the coupling assembly from the fixed coupling with the socket, and retracting the at least a part of the coupling assembly from the socket.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
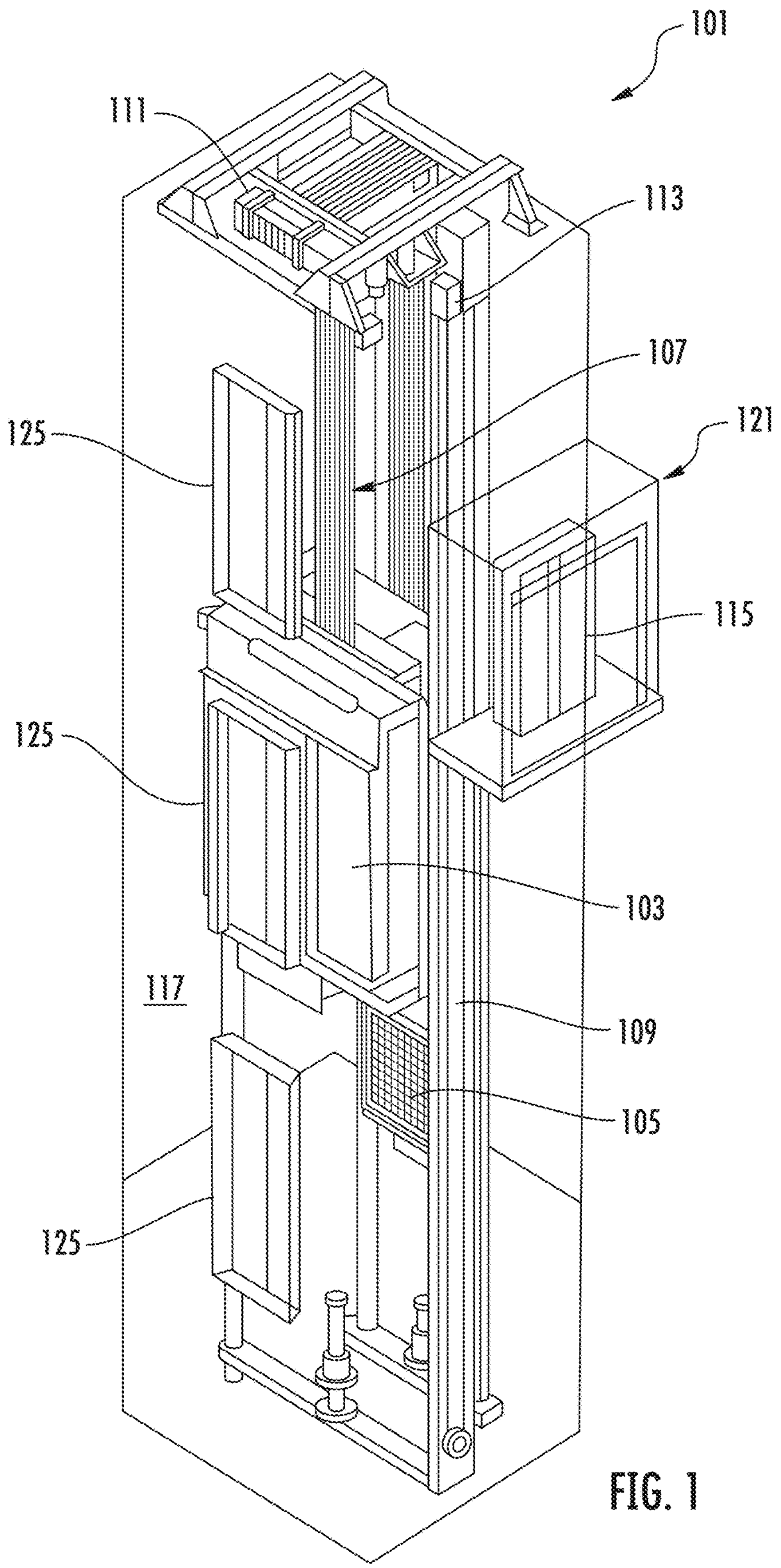
FIG. 1 is a schematic illustration of an elevator system that may employ various embodiments of the present disclosure.

FIG. 1 is a perspective view of an elevator system 101 including an elevator car 103, a counterweight 105, a roping 107, a guide rail 109, a machine 111, a position encoder 113, and an elevator controller 115. The elevator car 103 and counterweight 105 are connected to each other by the roping 107. The roping 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The roping 107 engages the machine 111, which, in this illustrative embodiment, is part of an overhead structure of the elevator system 101, although other arrangements are possible without departing from the scope of the present disclosure. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The elevator controller 115 is located, as shown in the illustrative arrangement, in a controller room 121 of the elevator shaft 117 and is configured to control the operation of the elevator system 101, and particularly the elevator car 103. In other embodiments the controller 115 can be located in other locations, including, but not limited to, fixed to a landing or landing door or located in a cabinet at a landing. The elevator controller 115 may provide drive signals to the machine 111 to control the acceleration, deceleration, leveling, stopping, etc. of the elevator car 103. The elevator controller 115 may also be configured to receive position signals from the position encoder 113. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. Although shown and described with a roping system, elevator systems that employ other methods and mechanisms of moving an elevator car within an elevator shaft may employ embodiments of the present disclosure. FIG. 1 is merely a non-limiting example presented for illustrative and explanatory purposes. For example, although illustrated as a passenger elevator system, it will be appreciated that vehicle, automobile, and other heavy-load elevator systems may be configured with similar features and components.

It may be beneficial to enable an elevator car to secure or otherwise couple to the building or elevator shaft to provide a secured and rigid connection. Such rigid connections may be used for loading and unloading operations, particularly for potentially heavy loads and/or to ensure that an elevator car sill is maintained in a substantially level position relative to an adjacent landing. Such systems may be arranged and configured to accommodate misalignment between the car sill and the landing, particularly during a coupling operation. Once the coupling is complete, the systems may be fixed or secured such that further movement of the elevator car is prevented or substantially minimized. In accordance with some embodiments of the present disclosure, the elevator cars that may incorporate elevator platform locking systems as described herein may be passenger elevator cars, cargo or maintenance elevator cars, vehicle elevators cars, or the like, as will be appreciated by those of skill in the art in view of the teachings herein.

Referring now to FIGS. 2A-2D, schematic illustrations of a portion of an elevator system 200 in accordance with an embodiment of the present disclosure are shown. The elevator system 200 includes an elevator car 202 having a car sill 204 mounted or installed on an elevator platform 206. The elevator car 200 is movable along an elevator shaft and is configured to stop at one or more floors/landings, and as shown in FIG. 2, the car sill 204 is arranged proximate a landing sill 208 of a landing 210. The landing 210 may be one of multiple different landings arranged vertically along the elevator shaft and/or may be one of multiple different landings arranged at a single level of the elevator shaft. During operation, the elevator car 200 may be configured to selectively and securely engage or couple with the building to ensure that the elevator car 200 does not move as a load is added or removed from the elevator car 200.

In order to securely and fixedly couple the elevator car 200 to the landing 210, the elevator car 200 and landing 210 are configured with a platform locking system 212. As shown in this illustrative configurations, the platform locking system 212 includes a landing portion 214 and a car portion 216. The landing portion 214 of the platform locking system 212 is affixed to the landing 210 (or wall of the elevator shaft) beneath the landing sill 208. The car portion 216 of the platform locking system 212 is installed in or to the elevator platform 206 below the car sill 204. When the elevator car 200 is positioned at the landing 210, it may be desirable to ensure that the car sill 204 does not move relative to the landing sill 208, particularly during loading/unloading operations. Thus, the landing portion 214 and the car portion 216 are arranged to be substantially aligned when the elevator car 200 is stopped at the landing 210.

The landing portion 214 includes a socket 218 that is affixed to the landing 210 and/or the landing sill 208, and in this configuration is arranged beneath the landing sill 208 and affixed to a wall of the elevator shaft. It will be appreciated that a similar configuration may be incorporated at a top portion of an elevator car or arranged at other positions and/or locations on the elevator car and/or walls of the elevator shaft. The socket 218 is configured to receive a portion or part of the car portion 216 within a socket cavity 220.

The car portion 216 includes a support arm 222 with a coupling assembly 224 arranged at an end of the support arm 222. The coupling assembly 224 includes a hydraulic cylinder 226 arranged at an end of the support arm 222. The hydraulic cylinder 226 defines a housing with an internal cavity that contains a working fluid 228 (e.g., incompressible fluid). The internal cavity of the hydraulic cylinder 226 is separated into a first chamber 230 and a second chamber 232, which are divided by a piston 234. The piston 234 is part of a movable element 236 which is configured to be moved within the internal cavity of the hydraulic cylinder 226 to change the size of the respective chambers 230, 232 and quantity of the working fluid 228 within each of the respective chambers 230, 232. To accommodate the change in position of the piston 234 and movement of the movable element 236, the first chamber 230 and the second chamber 232 fluidly coupled by a flow path 238. For example, as the working fluid 228 enters the first chamber 230, the piston 234 may be urged in a direction toward the second chamber 232 such that the second chamber 232 reduces in volume and the first chamber 230 increases in volume. As this occurs, the piston 234 is moved relative to the hydraulic cylinder 226 and the movable element 236 is also moved relative to the hydraulic cylinder 226. The movable element 236 includes ramps 240. The ramps 240 have tapered surfaces that are arranged to enable engagement of the car portion 216 with the landing portion 214. The ramps 240 are configured to slidingly engage with surfaces of the socket 218 such that the coupling assembly 224 may be inserted into and engage with the socket 218. In other configurations, the ramps 240 may be replaced by taper pins or other structures that can adjust the alignment between the coupling assembly 224 and the socket 218 during engagement of the two elements.

Figure 2A:
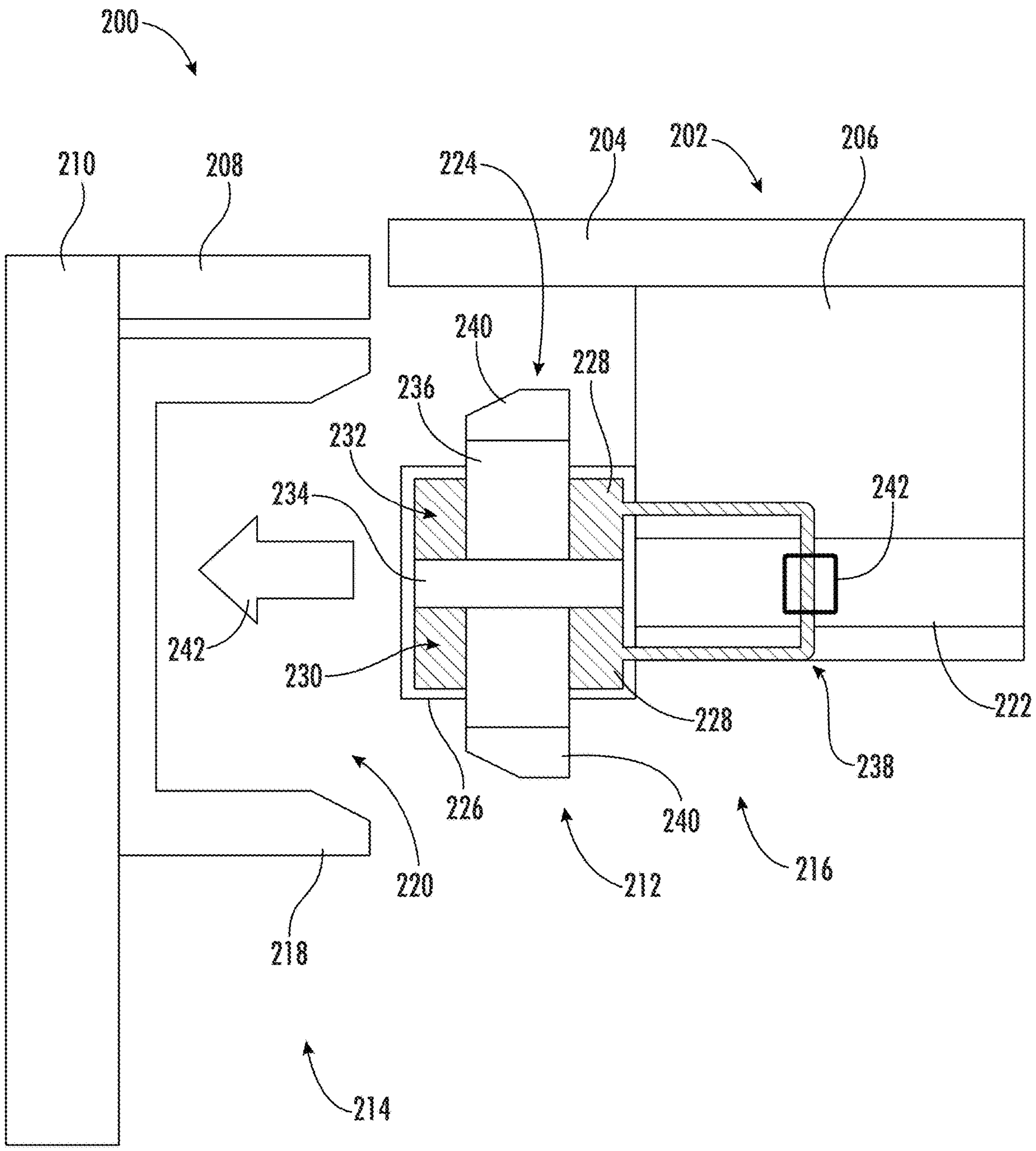
FIG. 2A is a schematic illustration of a platform locking system for an elevator system in accordance with an embodiment of the present disclosure, the platform locking system shown in a first stage of operation.
Figure 2B:
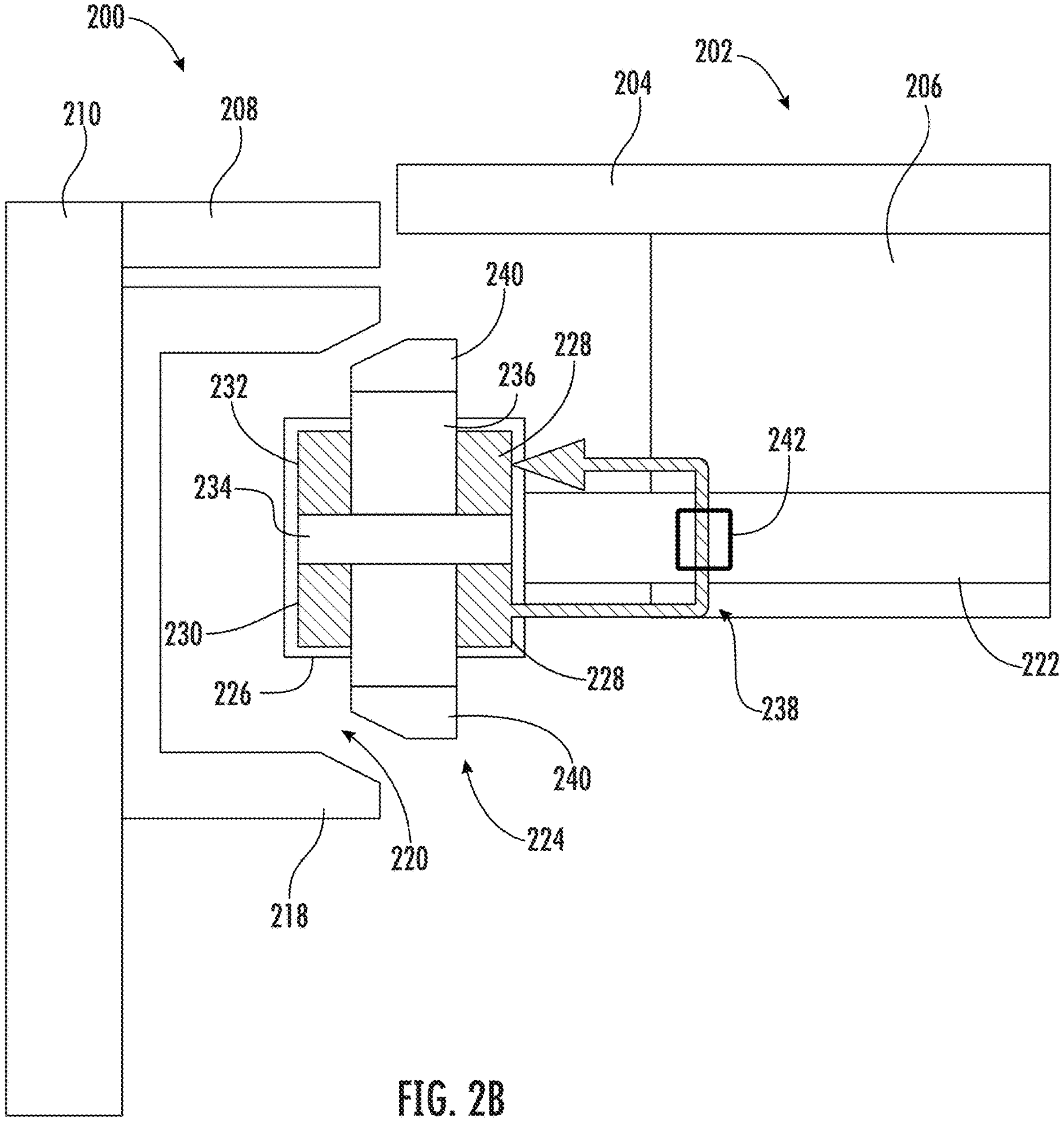
FIG. 2B is a schematic illustration of the platform locking system of FIG. 2A, in a second stage of operation.

As indicated by the arrow 242 of FIG. 2A, the coupling assembly 224 may be translated by extending the support arm 222. A partial extension of the support arm 222 is shown in FIG. 2B. As shown in FIGS. 2A-2B, the car sill 204 is arranged slightly above or offset from the landing sill 208. This offset may be acceptable for use purposes, but can result in a misalignment of the coupling assembly 224 relative to the socket 218. As such, when the coupling assembly 224 is deployed or activated to be engaged with the socket 218, the misalignment could cause problems with the coupling. However, because the coupling assembly 224 is configured with the piston 234 and working fluid 228, as the coupling assembly 224 is moved into the socket cavity 220, the ramps 240 may contact the socket 218 to move the movable portion 236 relative to the hydraulic cylinder 226. As the movable portion 236 is urged into movement, the working fluid 228 will be caused to move from one of the cavities (e.g., first chamber 230) to the other of the cavities (e.g., second chamber 232) defined within the hydraulic cylinder 226.

In some configurations, the size and shape of the coupling assembly 224 may be set to be slightly smaller than the inner surfaces of the socket 218 such that a transition fit or line-to-line engagement is achieved. A clearance fit may also be employed. Furthermore, in some embodiments, the ramps 240 may be formed of a semi-pliant material that can allow for an interference fit between the coupling assembly 224 and the socket 218.

Figure 2C:
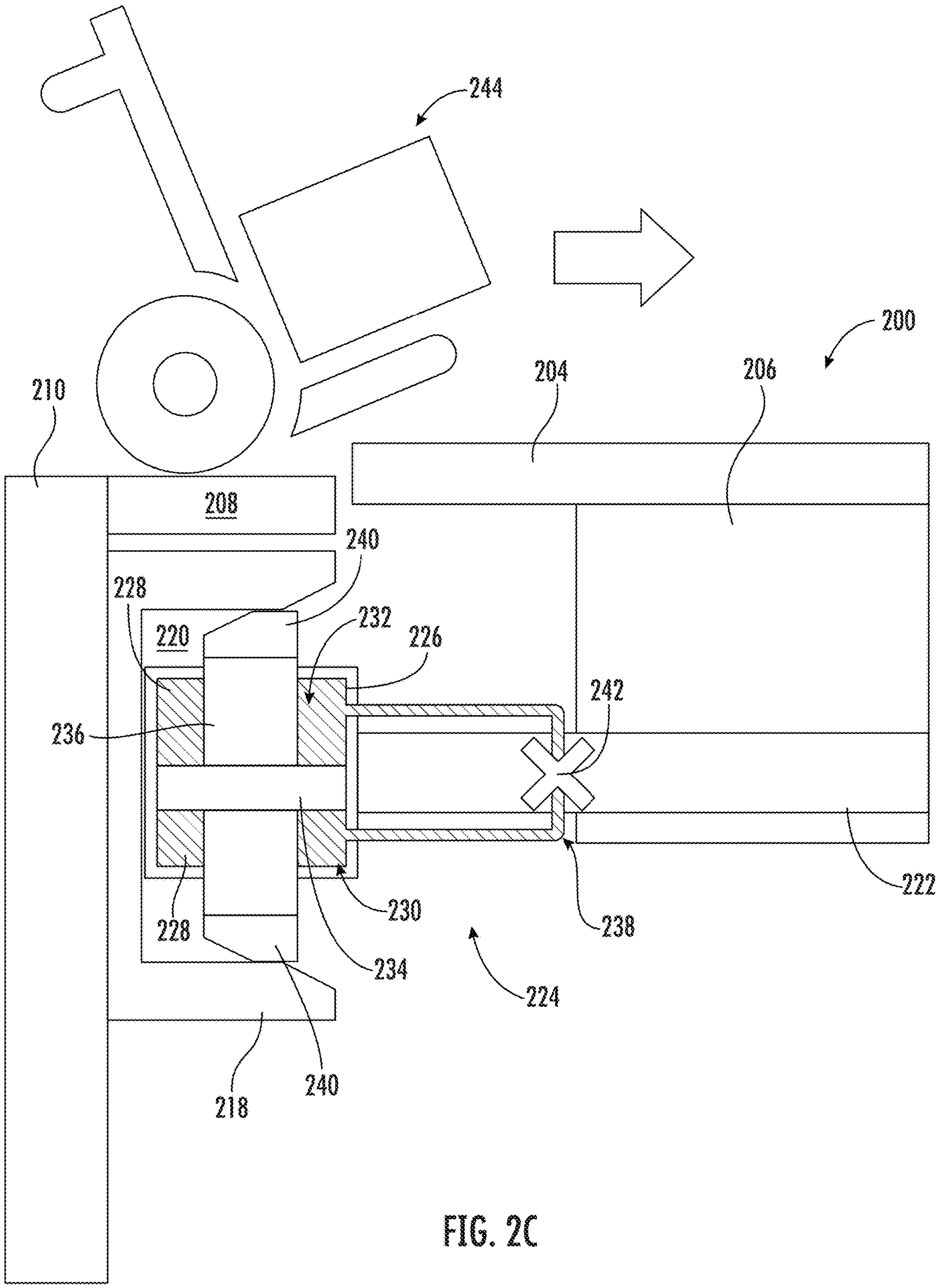
FIG. 2C is a schematic illustration of the platform locking system of FIG. 2A, in a third stage of operation, with the platform locking system coupling an elevator car to a landing.

As shown in FIG. 2C, the coupling assembly 224 is engaged within the socket 218, with the ramps 240 arranged in contact with internal surfaces of the socket 218. As shown, the second chamber 232 is substantially larger than the first chamber 230 because the piston 234 was moved downward relative to the hydraulic cylinder 226. Once the coupling assembly 224 is engaged within the socket 218, to ensure that no further movement of the elevator car 200 occurs, the flow path 238 may be closed using a flow controller 242 (e.g., valve, flow restrictor, etc.). With the flow controller 242 in a closed state, the working fluid 228 is prevented from moving between the chambers 230, 232, thus holding the piston 234 in place, and thereby fixedly securing the coupling assembly 224 within the socket 218. In some configurations, a partial flow restriction may be employed to achieve a variable stiffness of the connection between the coupling assembly 224 and the socket 218, allowing for some amount of movement, such as to enable detection of a load or the like. With the coupling assembly 224 engaged with the socket 218, the elevator car 200 is fixedly coupled to the elevator shaft to ensure that the car sill 204 does not move when a load 244 is moved onto the elevator car 200 (or off of the elevator car 200).

Figure 2D:
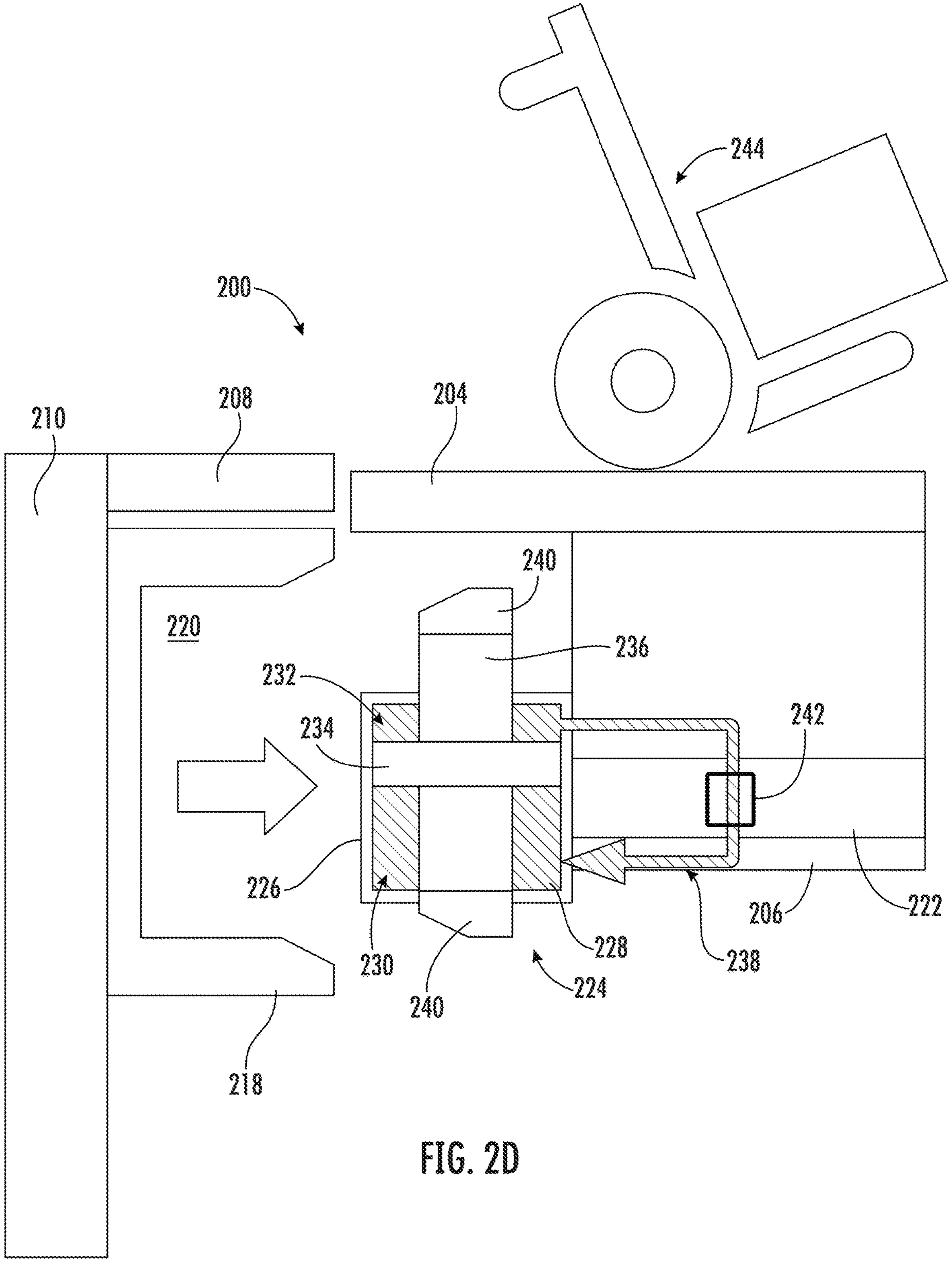
FIG. 2D illustrates a decoupling operation of the platform locking system of FIG. 2A.

As shown in FIG. 2D, after the load 244 is moved on to the elevator car 200, the flow controller 242 may be reopened to allow fluid flow of the working fluid 228 to flow between the two chambers 230, 232 of the hydraulic cylinder 226. When the coupling assembly 224 is removed from the socket 218, the elevator car 200 may change position (move) within the elevator shaft because the elevator car 200 is no longer fixedly coupled to the elevator shaft using the platform locking system 212.

In accordance with some embodiments, the operation of the platform locking systems of the present disclosure may be performed automatically, remotely, manually, or a combination thereof. In the case of an automatic platform locking system, when the elevator car reaches a designated landing and the elevator car doors are intended to be opened for loading/unloading, the operation of the platform locking system may be performed automatically before opening of the doors. This may be controlled by an elevator controller or the like, as will be appreciated by those of skill in the art. In the case of a manual or remote operation, a user may activate a button, switch, key activation, or the like to cause the platform locking system to operate and have the coupling assembly engage with a socket, as described above. In accordance with some non-limiting embodiments, a passive system (e.g., hydraulic, pneumatic, electric, electronic, mechanical, etc.) is provided where a dual acting hydraulic cylinder assembly (e.g., hydraulic cylinder 226, piston 234, movable element 236, and working fluid 228) is used to restrain the motion of the elevator car. The cylinder (e.g., hydraulic cylinder 226) is configured such that the piston (e.g., piston 234) is free to accommodate any landing inaccuracy during engagement, as fluid (e.g., working fluid 228) flows from one end of the cylinder to the other (e.g., between chambers 230, 232). Once a rigid connection is required, flow between ends (e.g., chambers 230, 232) is blocked by a flow controller (e.g., flow controller 242) and the cylinder behaves rigidly due to the incompressible nature of the working fluid 228. The load can then be released by allowing flow between cylinder ends.

Figure 3A:
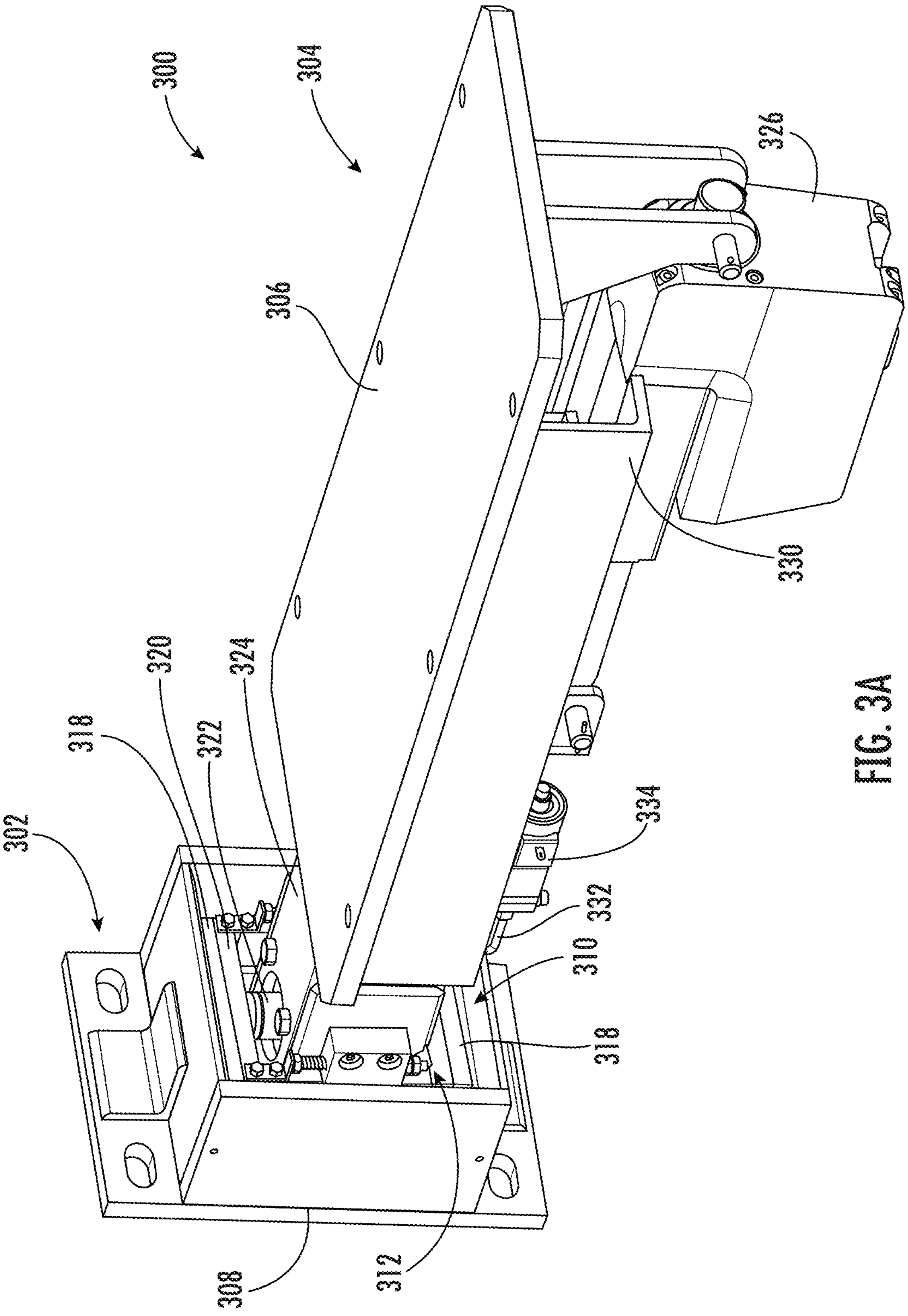
FIG. 3A is a schematic illustration of a platform locking system in accordance with an embodiment of the present disclosure.
Figure 3B:
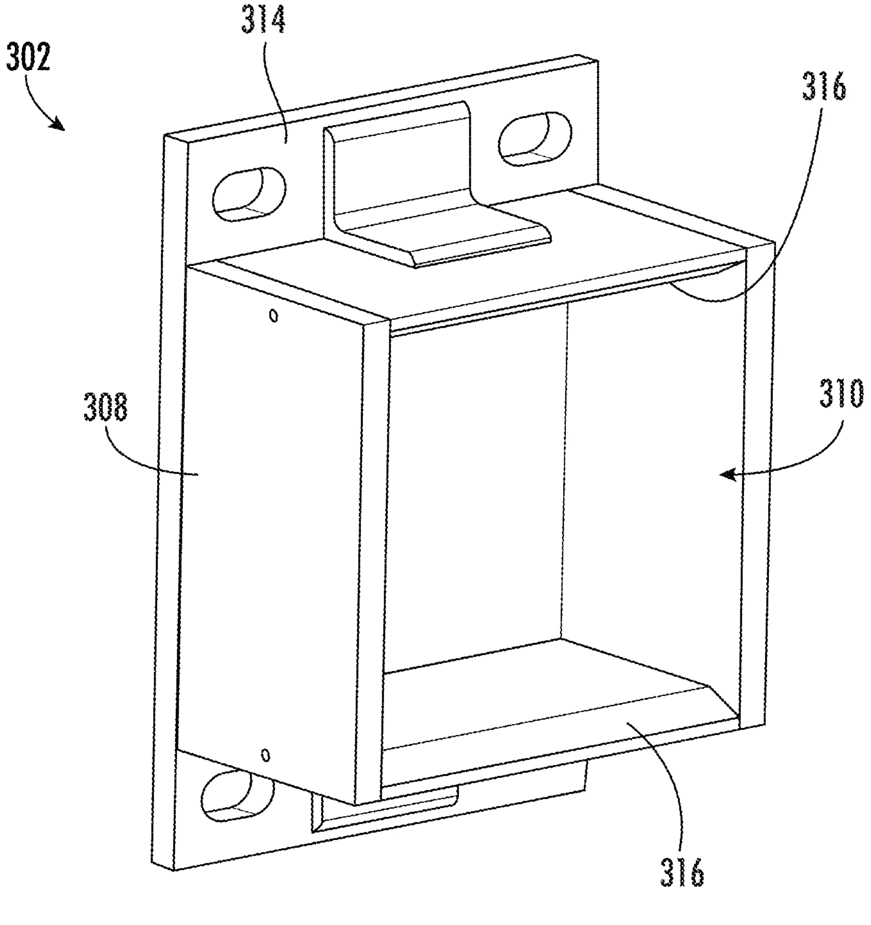
FIG. 3B is a schematic illustration of a landing portion of the platform locking system of FIG. 3A.
Figure 3C:
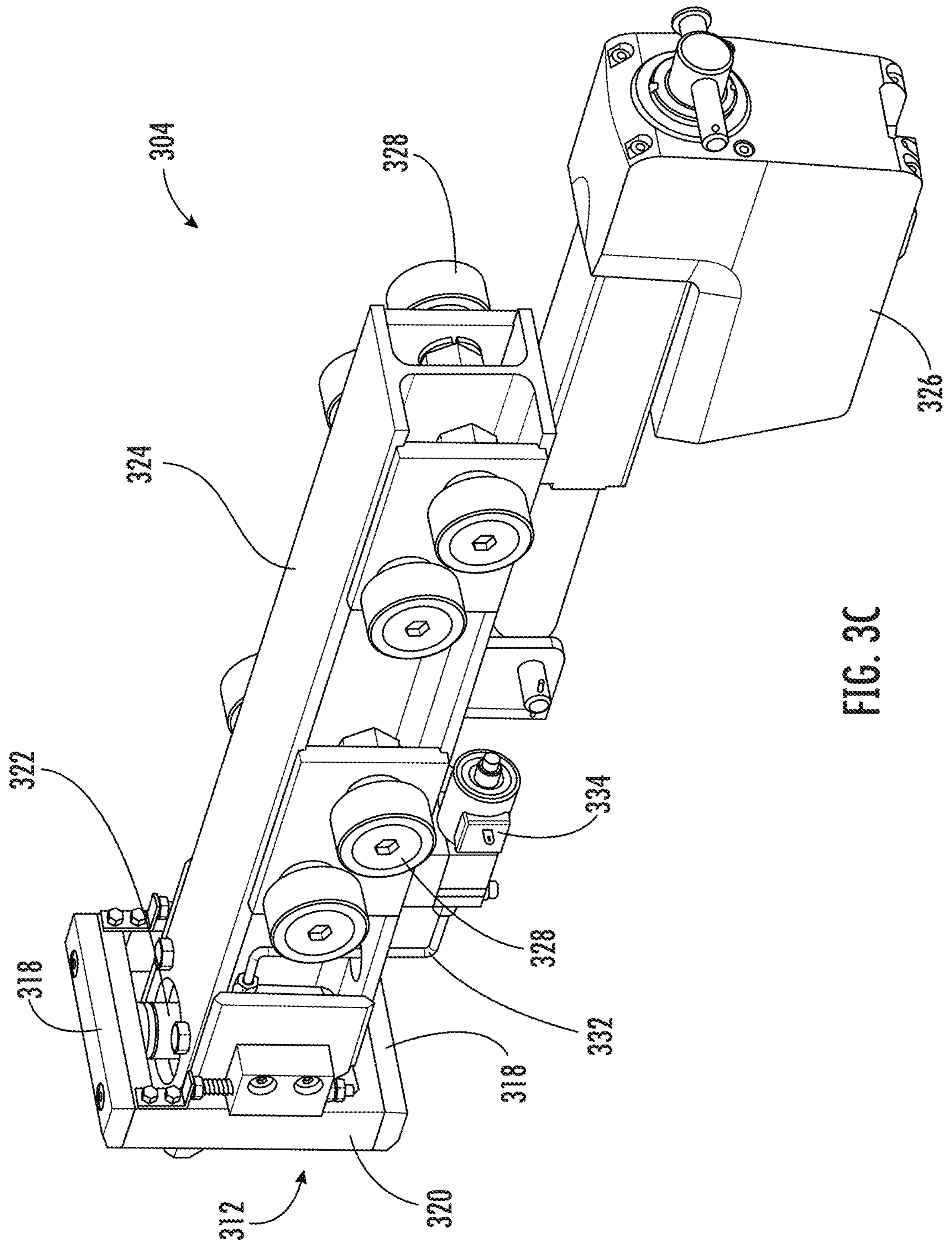
FIG. 3C is a schematic illustration of a part of a car portion of the platform locking system of FIG. 3A.
Figure 3D:
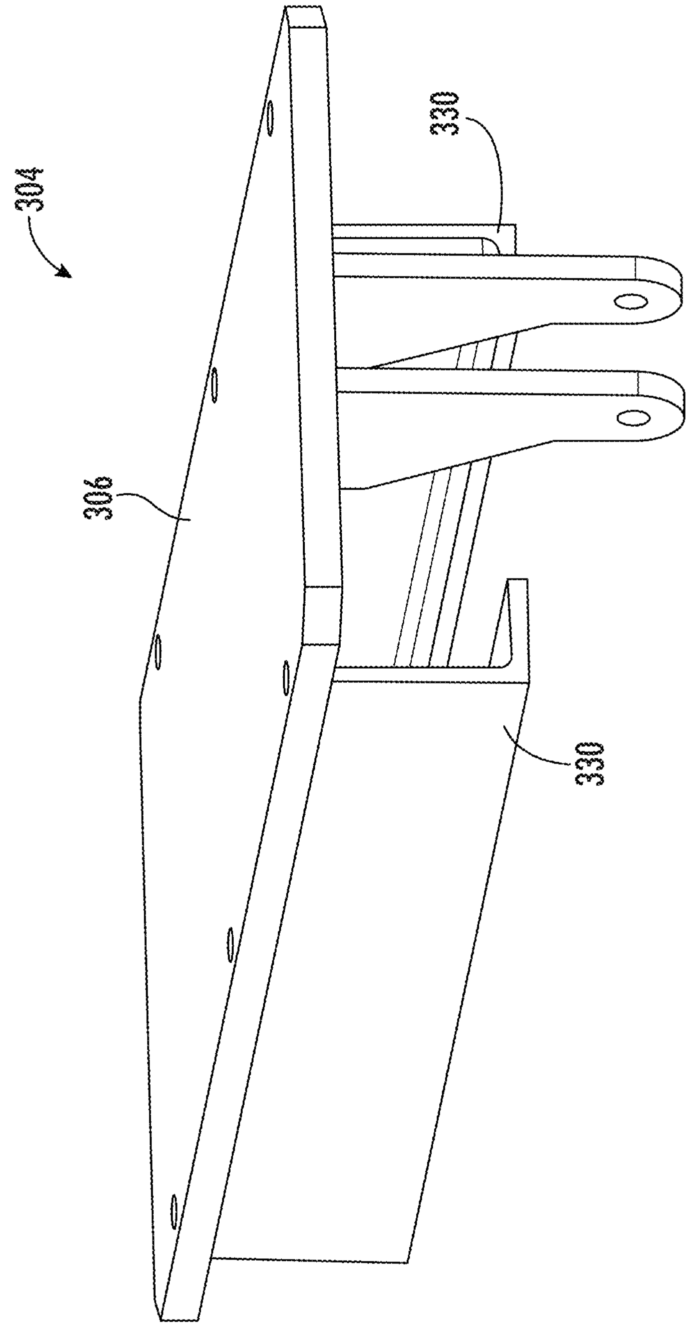
FIG. 3D is a schematic illustration of another part of the car portion of the platform locking system of FIG. 3A.
Figure 3E:
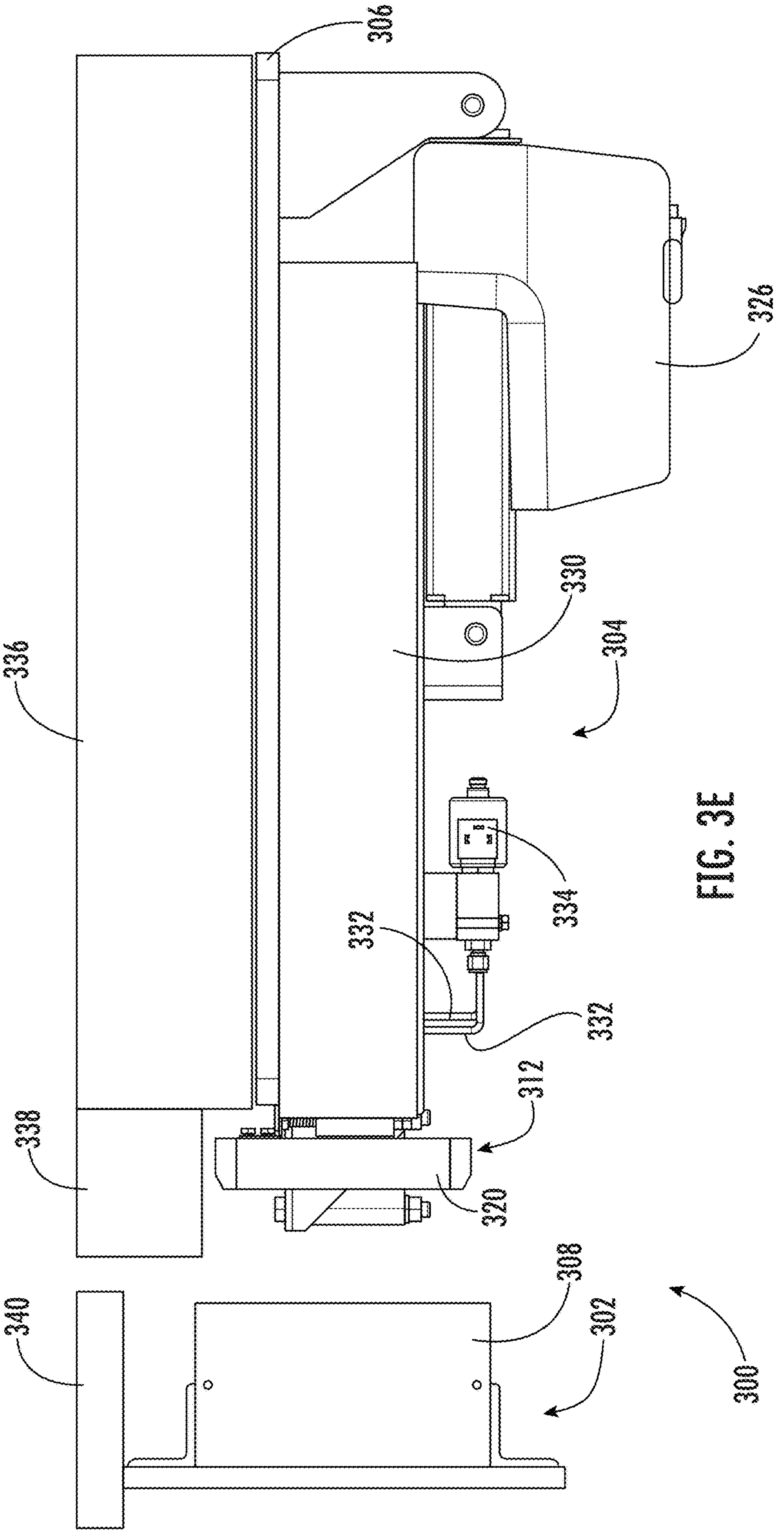
FIG. 3E is a side view of a step of operation of the platform locking system of FIG. 3A, shown prior to engagement between the car portion and the landing portion.
Figure 3F:
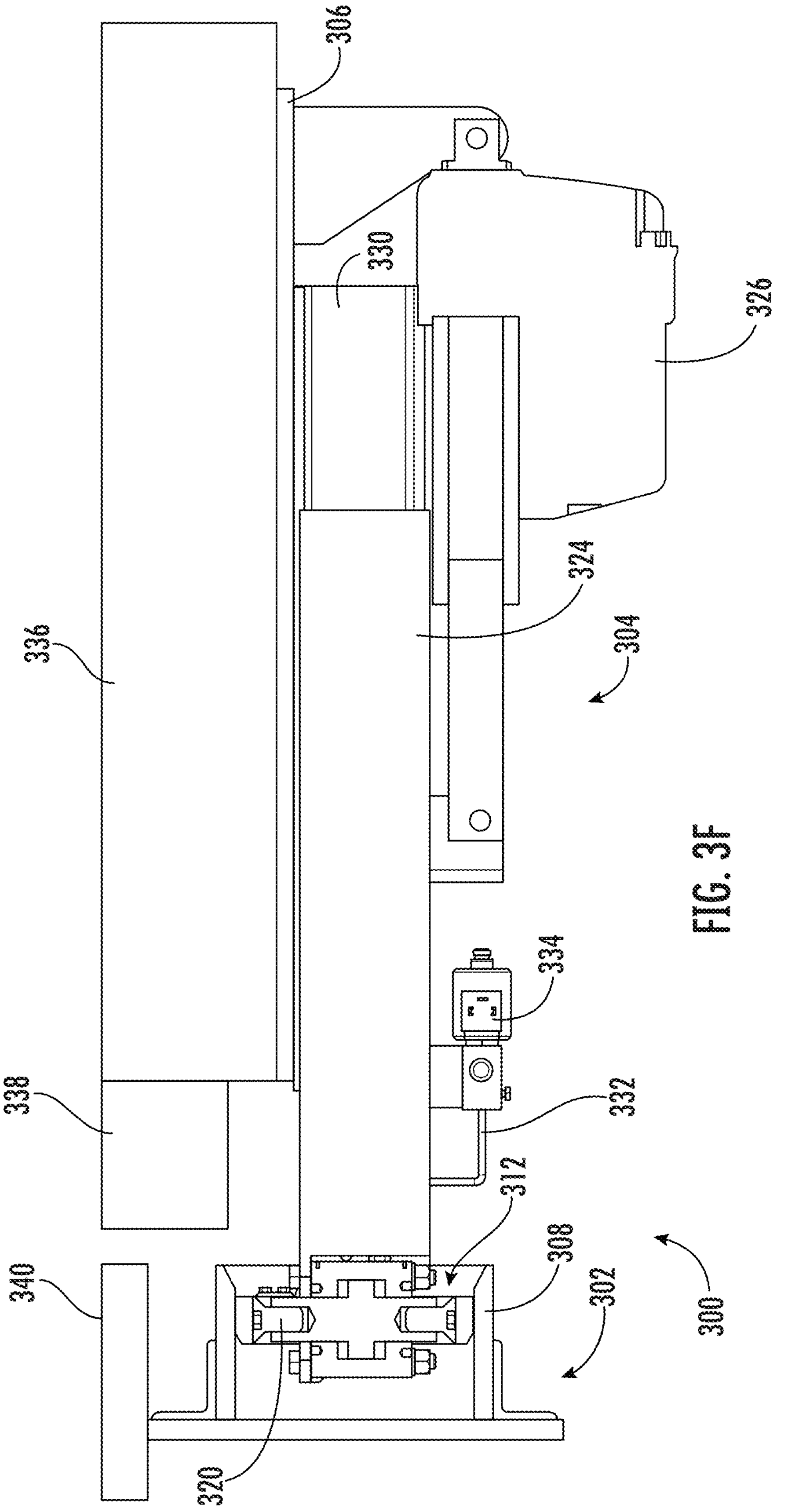
FIG. 3F is a side, cross-sectional illustration of the platform locking system of FIG. 3A shown with engagement between the car portion and the landing portion.
Figure 3G:
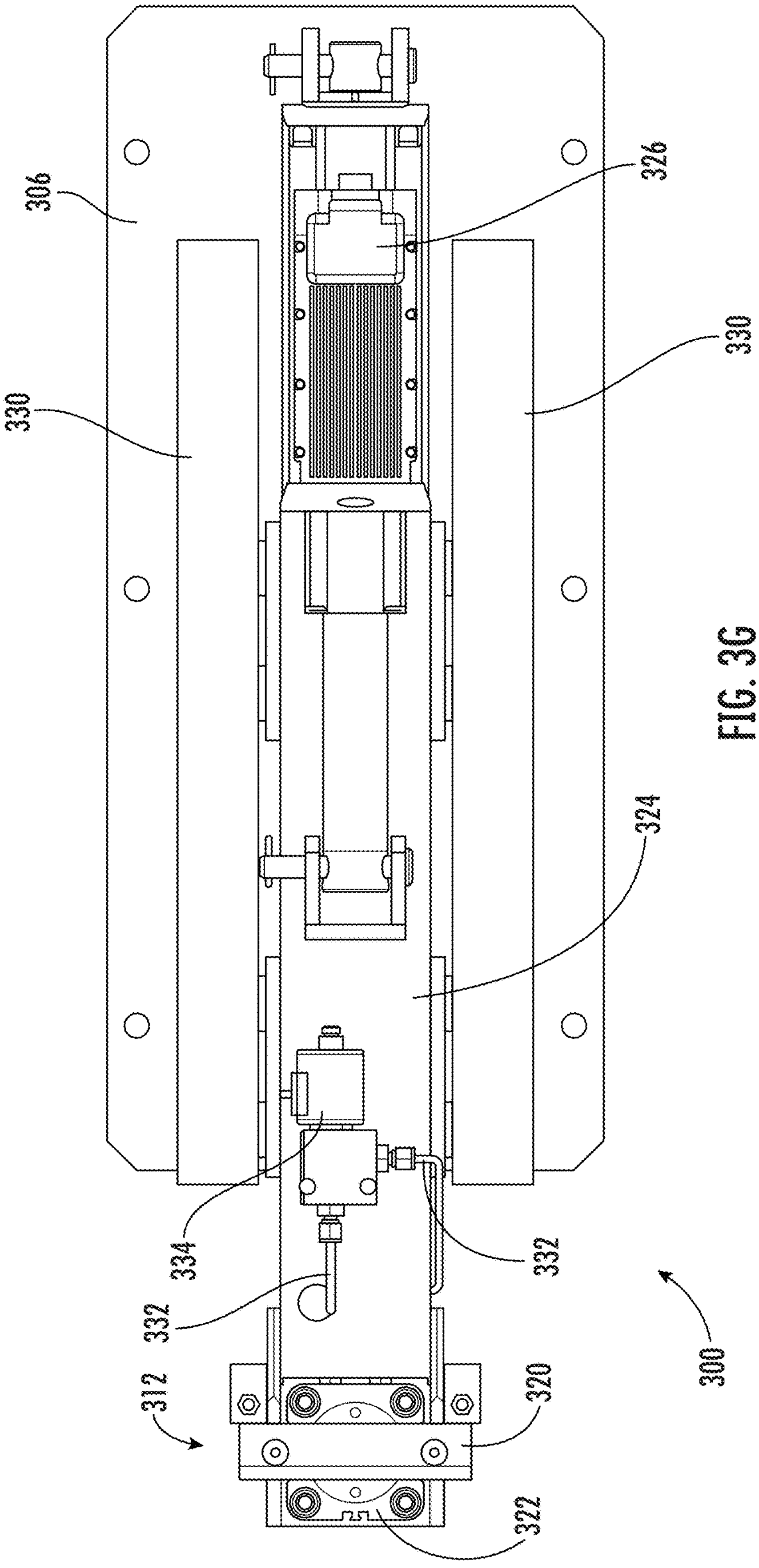
FIG. 3G is a bottom view of the platform locking system of FIG. 3A shown with engagement between the car portion and the landing portion.

Referring now to FIGS. 3A-3G, schematic illustrations of a platform locking system 300 in accordance with an embodiment of the present disclosure are shown. FIG. 3A is a perspective view of the platform locking system 300. FIG. 3B illustrates a part of a landing portion 302 of the platform locking system 300. FIG. 3C illustrates parts of a car portion 304 of the platform locking system 300. FIG. 3D illustrates a mounting bracket 306 of the car portion 304 for connecting the car portion 304 to an elevator car. FIG. 3E is a side elevation view of the platform locking system 300 shown in a retracted state. FIG. 3F is a side elevation view of the platform locking system 300 shown in an extended or deployed state. FIG. 3G is a bottom view of the car portion 304 of platform locking system 300 shown in the extended or deployed state. The platform locking system 300 may be installed on an elevator car similar to that shown and described above and is operable to selectively fixedly and rigidly couple an elevator car to a building.

Referring to FIGS. 3A-3G, the platform locking system 300 includes the landing portion 302 and the car portion 304. The landing portion 302 includes a socket 308 that defines a socket cavity 310 for receiving a coupling assembly 312 of the car portion 304. As shown in FIG. 3B, the landing portion 302 includes a socket mounting bracket 314 for securing the socket 308 to an elevator shaft wall, a landing sill, or other structure that is arranged near a landing door of an elevator system. The socket 308 may also include optional socket ramps 316 that define angled surfaces. The socket ramps 316 may be arranged to aid in seating the coupling assembly 312 within the socket cavity 310 of the socket 308. The coupling assembly 312 may include corresponding ramps 318 that are arranged on a movable element 320 of the car portion 304. The ramps 318 may aide seating of the movable element 320 within the socket 308. For example, if the movable element 320 is not aligned with the socket 308, the ramps 318 may allow for urging the movable element 320 into proper seating within the socket 308. The movable element 320 is configured to move relative to a hydraulic cylinder 322, similar to that described above, such as by flow of a working fluid between two chambers separated by a piston.

The hydraulic cylinder 322 and the movable element 320 are arranged at an end of a support arm 324. The support arm 324 is movable and driven by a linear actuator 326. The support arm 324 includes one or more rollers 328 to allow for linear or translational movement of the support arm 324 relative to the mounting bracket 306 of the car portion 304. The mounting bracket 306 includes support tracks 330 along which the rollers 328 will travel when the linear actuator 326 is actuated to deploy (extend or retract) the support arm 324 and the components/elements attached thereto. The linear actuator 326 may be controlled via wired or wireless communication with an elevator controller or other electronic control system. In some embodiments, as noted above, the linear actuator 326 may be configured to actuate automatically when an associated elevator car reaches a landing and the doors of the elevator are to be opened for loading/unloading. When operated, the coupling assembly 312 is moved by linear operation of the linear actuator 326 and the coupling assembly 312 is directed into the socket cavity 310 of the socket 308. As the coupling assembly 312 begins to enter the socket cavity 310, the ramps 318 of the coupling assembly 312 and the socket ramps 316 may interact to aid in positioning the coupling assembly 312 within the socket 308.

As the coupling assembly 312 is positioned within the socket 308, the movable element 320 may be adjusted freely upward or downward due to free flow of a working fluid, similar to that described above. For example, a working fluid may flow freely between two chambers or cavities (e.g., first chamber 230 and second chamber 232 shown in FIGS. 2A-2D). When the coupling assembly 312 is fully inserted into the socket 308, the working fluid may be contained within the hydraulic cylinder 322 and a flow path 332. A flow controller 334 is arranged along the flow path 332 and is configured to selectively stop free flow through the flow path 332. For example, as the coupling assembly 312 is moved from a retracted state (e.g., FIG. 3E) to a deployed or extended state (e.g., FIGS. 3A, 3F, 3G), the flow controller 334 is open or in an open state. Once the coupling assembly 312 is seated within or coupled to the socket 308, the flow controller 334 may close, shut off, or otherwise enter a closed state such that free flow of the working fluid is prevented. With the working fluid prevented from flowing through the flow path 332, and due to the working fluid being incompressible, the coupling assembly 312 will become a rigid structure that will not move and thus can hold an elevator car in place relative to a landing.

In some configurations, an intermediate flow control operation for a restricted flow between the chambers may be employed to achieve a variable stiffness of the coupling. Such intermediate or variable stiffness coupling may permit for small movements of the elevator car while maintaining a substantially rigid connection that will resist large movement of the elevator car. As such, releveling or small vertical adjustments of the elevator car may occur to level the car with the landing. After a leveling or releveling operation is performed during such an intermediate coupling step, the fluid flow may be completely restricted to secure the elevator car to the landing, as described above. Such intermediate or variable stiffness coupling, for example, may also be used to estimate or measure a load of the elevator car, via monitoring the pressures of the fluids within the coupling.

Referring now to FIGS. 3E-3G, schematic illustrations of operation of the platform locking system 300 are shown. FIG. 3E illustrates the platform locking system 300 in a retracted state and FIGS. 3F-3G illustrate the platform locking system 300 in a deployed or extended state. As shown in FIGS. 3E-3F, the platform locking system 300 may be mounted or affixed to the bottom of an elevator platform 336. For example, the mounting bracket 306 may be configured to be fixedly attached to the elevator platform 336 using fasteners, welding, bonding, or other means of attachment. When in the retracted state (FIG. 3E), the coupling assembly 312 is arranged beneath a car sill 338 and is not extended such that the coupling assembly 312 does not interfere with travel of the elevator car within an elevator shaft.

When the platform locking system 300 is actuated or operated, such as when arriving at a landing having a landing sill 340, the linear actuator 326 may be operated to deploy and extend the support arm 324 along the support tracks 330. The coupling assembly 312 is thus moved toward the socket 308. As the coupling assembly 312 begins to enter the socket cavity 310 of the socket 308, the ramps 318 of the coupling assembly 312 may contact and interact with the socket ramps 316 to cause the movable element 320 to be urged into centering within the socket 308. It is noted that as the movable element 320 is moved due to interaction of the ramps 316, 318, the position of the support arm 324 does not change. That is, it is only the movable element 320 that adjusts vertically during the engagement/coupling operation. The movable element 320 is adjusted vertically by means of a working fluid flowing between two chambers of a hydraulic cylinder, as described above. Once the movable element 320 is seated within the socket 308, the flow controller 334 will switch to a closed state to prevent further flow of fluid between the chambers, and thus the assembly becomes a rigid structure that can hold the elevator car in place during loading and unloading. After the loading/unloading operation(s) is/are complete, the flow controller 334 may open, and the coupling assembly 312 may be withdrawn from the socket 308 by operation of the linear actuator 326.

As shown in FIGS. 3A-3C, the socket 308 is box shaped, with two vertical walls and two horizontal walls, and the coupling assembly 312 has a complementary shape. In some configurations, the vertical portions may be omitted, with the socket defined by two parallel plates or the like. Such parallel plates may include socket ramps or other tapered surfaces to aid in the positioning of the coupling assembly within the socket. Moreover, in some embodiments, the sockets may be defined along a full width of the elevator shaft, such that a single large socket that extends the width of the landing/elevator car may be arranged to receive one or more coupling assemblies. Furthermore, although shown with a substantially square shape, it will be appreciated that other geometries of the socket and/or the coupling assembly may be employed without departing from the scope of the present disclosure. The geometry of the coupling assembly and the socket may be selected to achieve a self-alignment between the two components, such as by use of tapered surfaces, taper pins, or the like.

In the above described configurations, the platform locking systems are shown and illustrated as a hydraulic configuration, relying upon flow of an incompressible working fluid between chambers of a hydraulic cylinder. The flow may be controlled by a flow controller to prevent or restrict flow and lock the system into a rigid state or semi-rigid state. However, it will be appreciated that other types of mechanisms may be used without departing from the scope of the present disclosure. For example, and without limitation, the free movement and selective locking/fixing may be achieved using magnetorheological systems, pneumatics, mechanical spring and locking arrangements, solenoids and/or linear actuators, or the like. Accordingly, it will be appreciated that the above described and illustrated configurations are merely for explanatory and illustrative purposes and are not intended to be limited to the specific features therein described.

Furthermore, although the translation or extension of the coupling assembly is shown and described using a linear actuator, other mechanisms for translational movement may be employed without departing from the scope of the present disclosure. For example, and without limitation, the lateral or horizontal movement may be provided using linear actuators, rock-and-pinion configurations, gearing systems, magnetic systems, hydraulic systems, pneumatic systems, electrically driven actuators, or the like, as will be appreciated by those of skill in the art.

Figure 4A:
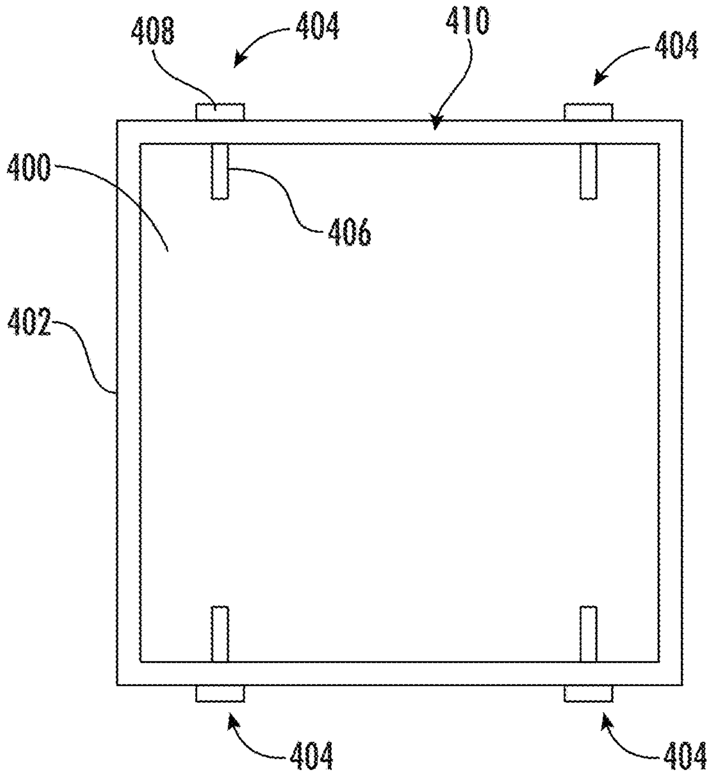
FIG. 4A is a schematic illustration of an elevator car having multiple platform locking systems in accordance with the present disclosure, shown in a disengaged state.
Figure 4B:
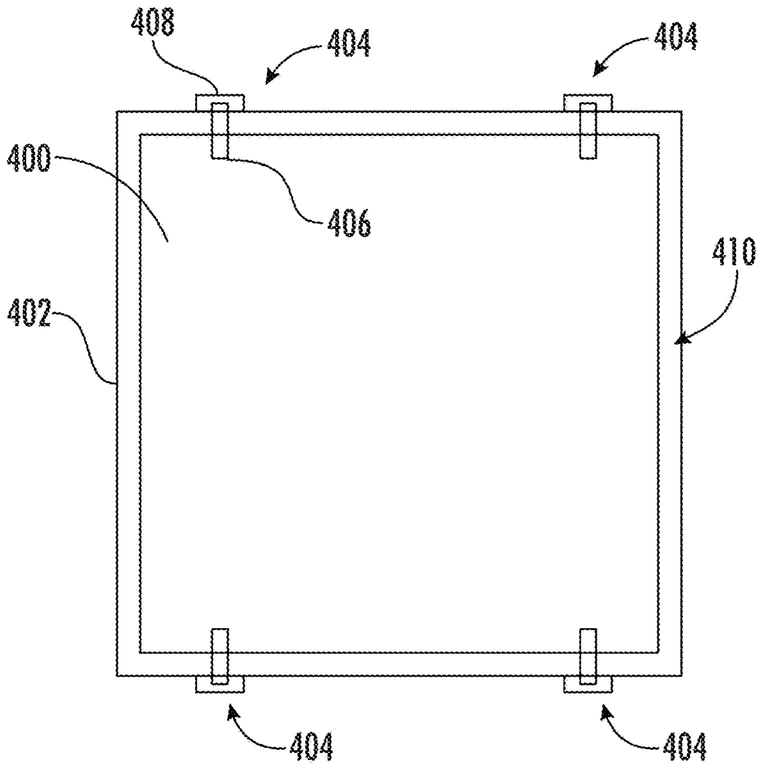
FIG. 4B illustrates the systems of FIG. 4A in an engaged state.

Referring now to FIGS. 4A-4B, schematic illustrations of an elevator car 400 in accordance with an embodiment of the present disclosure are shown. The elevator car 400 is configured to travel within an elevator shaft 402. In some configurations, the elevator shaft 402 may include a number of different floors or landings which may be arranged vertically along the elevator shaft. In some configurations, multiple elevator landing doors may be arranged on a single floor, and the elevator car 400 may be rotated or translated from one landing door to the next (e.g., car elevator, parking lifts, etc.). Further still, a combination of vertical and horizontal movement may be performed with the elevator car 400 to provide access to a number of different locations within a building. The elevator car 400 and elevator shaft 402 are configured with multiple platform locking systems 404 at each landing, shown with four platform locking systems 404 in the illustrations of FIGS. 4A-4B. Each platform locking system 404 includes a respective car portion 406 that is mounted to the elevator car 400, and a respective landing portion 408 for receiving a part of the respective car portions 406.

FIG. 4A illustrates the platform locking systems 404 in the retracted state, with a gap 410 illustrated between the elevator car 400 and the elevator shaft 402. The gap 410 is defined during normal operation such that the elevator car 400 may travel along the elevator shaft 402 freely. FIG. 4B illustrates the platform locking systems 404 in the deployed or extended state. As shown, the car portions 406 span the gap 410 to engage with the respective landing portions 408. It will be appreciated that an elevator car can include one, two, three, four, or more platform locking systems, which may be arranged at the top, bottom, or locations between the top and the bottom of the elevator car, without departing from the scope of the present disclosure. Depending on the loads expected to be carried by the elevator cars, the number and arrangement of platform locking systems may be customized to achieve a desired secure and stable coupling between the elevator car and the building.

Figure 5:
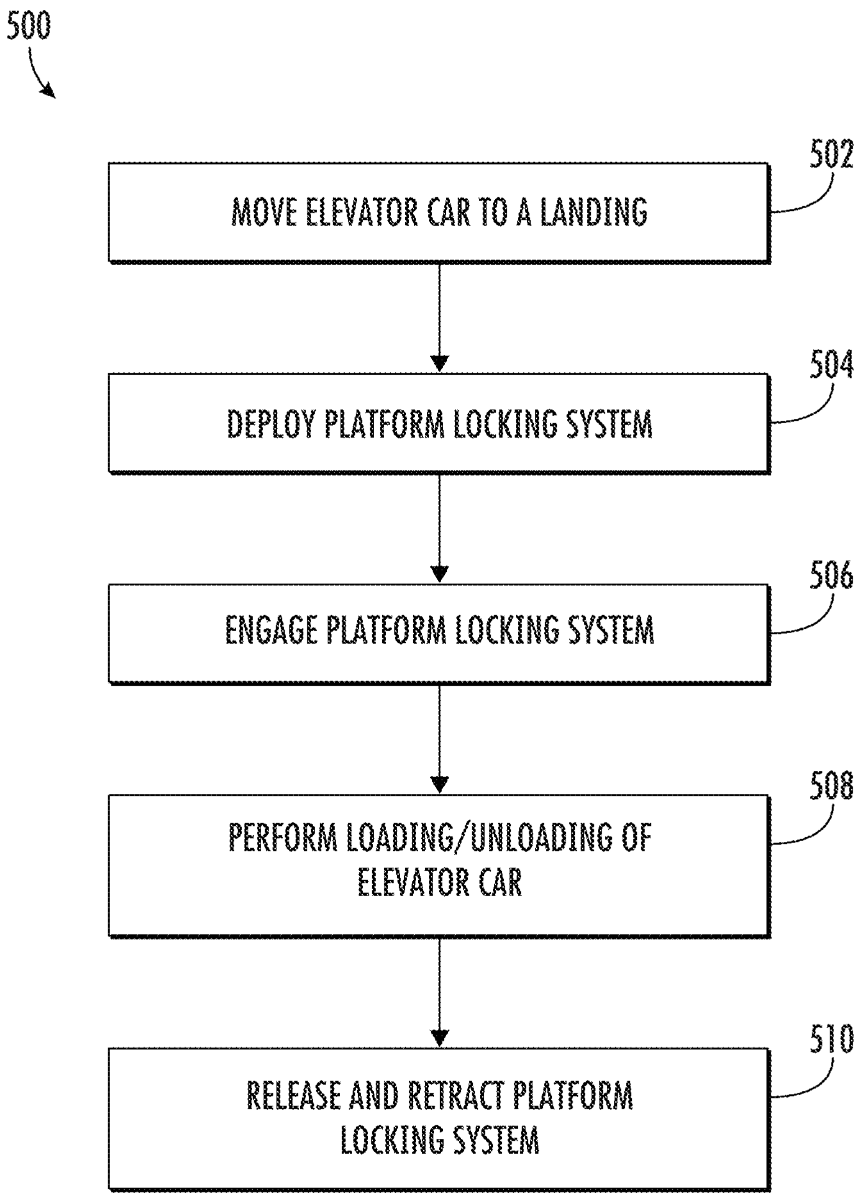
FIG. 5 is a flow diagram of a method of operating an elevator system in accordance with an embodiment of the present disclosure.

Referring now to FIG. 5, a flow process 500 for operating an elevator system is shown. The elevator system used to perform the flow process 500 includes at least one platform locking system, such as the systems shown and described above. At step 502, an elevator car is moved to a landing, where a loading/unloading operation is to be performed. When the elevator car arrives at the landing, before opening of the elevator car doors, or simultaneously therewith, the platform locking system may be deployed at step 504. During the deployment step of step 504, a coupling assembly may be extended from the elevator car toward a socket arranged on the building that defines an elevator shaft. During the deployment, a movable element of the coupling assembly is free moving to adjust in a vertical position relative to the socket to allow for a complete seating of the movable element within the socket.

At step 506, the platform locking system is engaged to form a rigid connection and coupling between the elevator car and the building. The engagement may be achieved by preventing flow between fluid chambers of a hydraulic cylinder, as shown and described above. In other embodiments, alternative (or additional) mechanisms of fixedly securing the movable element and the coupling assembly to the building may be employed. At step 508, with the elevator car fixedly coupled to the building by the platform locking system, a loading and/or unloading operation may be performed. Once the loading/unloading is completed, at step 510 the platform locking assembly may be released and retracted from coupling/engagement with the socket, to allow for free movement of the elevator car.

Figure 6:
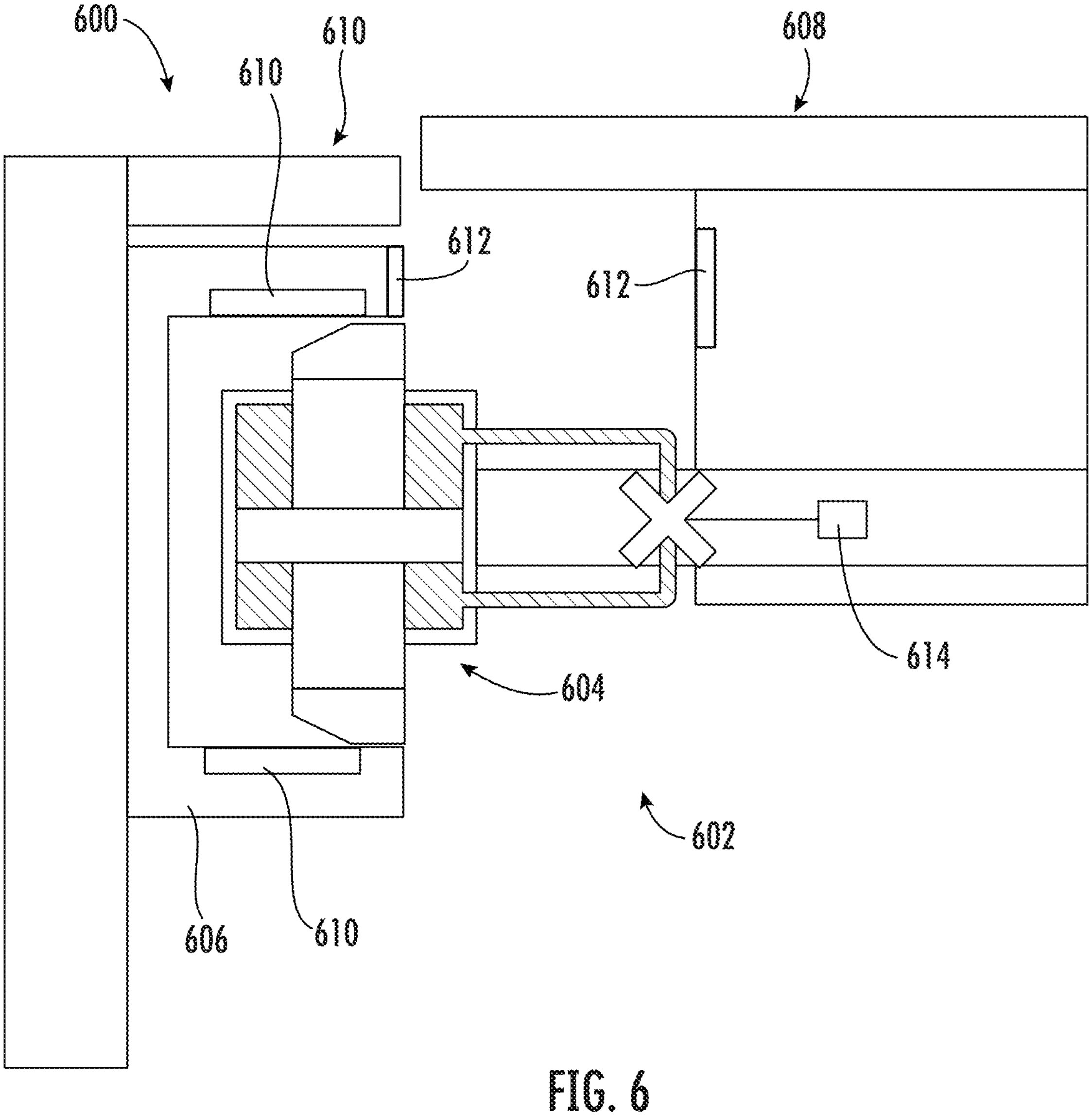
FIG. 6 is a schematic illustration of examples of sensors assemblies that may be incorporated with embodiments of the present disclosure.

Referring now to FIG. 6, a schematic illustration of an elevator system 600 having a platform locking system 602 in accordance with an embodiment of the present disclosure is shown. The platform locking system 602 may be similar to that shown and described above and thus like features may not be illustrated, labeled, or discussed for simplicity and clarity. The platform locking system 602 includes a coupling assembly 604 that is selectively deployable or extendable into engagement with a socket 606, for example, as shown and described above. The coupling assembly 604 is attached to an elevator car 608 and the socket 606 is attached to a landing 610.

In this illustrative configuration, the platform locking system 602 includes a number of sensors or sensor assemblies which may be used to aid operation of the platform locking system 602 and/or operation of the elevator system 600. For example, a first sensor assembly 610 may be provided to detect when the coupling assembly 604 is seated within the socket 606. Such a detection may provide data to a controller to determine when the coupling assembly 604 is fully inserted into the socket 606, and thus fluid flow locking or other locking of the coupling assembly 604 may be performed. A second sensor assembly 612 may be provided to detect the initial alignment position of the elevator car 608 relative to the landing 610. In some non-limiting configurations, and for example only, the second sensor assembly 612 may be used to perform a releveling operation prior to deployment of the coupling assembly 604. As such, an initial leveling and positioning of the coupling assembly 604 relative to the socket 606 may be performed. It will be appreciated that the releveling or initial leveling does not need to be perfect, because the platform locking system 602 may include the ramps, discussed above, to allow for minimal offset while still ensuring proper engagement and rigid connection.

In this illustration, the platform locking system 602 includes a third sensor assembly 614 which may be coupled to the flow line and/or hydraulic system of the platform locking system 602. The third sensor assembly 614 may be used to monitor the hydraulic circuit and measure the hydraulic pressure to estimate the load in the elevator car. This information may be conveyed to an elevator controller which can then adjust power to ensure support for the load after the platform locking assembly is disengaged from the building so that the elevator may properly support the load. For example, by allowing a restricted flow between the chambers of the coupling assembly 604, a small amount of flow may be achieved which can be monitored, and based on the flow or properties thereof, a load of the elevator car may be obtained. During such a state, the platform locking system 602 may be in partially fixed engagement, allowing for a small or acceptable amount of movement of the elevator car relative to the landing. In some embodiments, a partially restricted flow may be used to allow for damping of bouncing of the elevator car or for other purposes, as will be appreciated by those of skill in the art. That is, the platform locking system 602 may have a variable stiffness that ranges from no engagement and the elevator car is free to travel in the elevator shaft to a full, fixed engagement with the flow in the platform locking system 602 completely restricted and blocked from fluid exchange between the chambers thereof.

Advantageously, embodiments of the present disclosure are directed to systems and mechanisms for securely and rigidly connecting or coupling an elevator car to a building on a selective basis. The systems disclosed herein provide for relatively compact configurations that enable engagement and disengagement with relatively small force and can then transmit large forces with no relative motion. In accordance with some embodiments, automated coupling of the elevator car to a building may be performed to ensure the elevator car is secured during loading and unloading of loads. In some configurations, the platform locking systems may be used for vehicle or high load elevators, such as a 5 ton (10,000 lb; approximately 4,500 kg) capacity or greater, and multiple platform locking systems can increase the load capacity for the elevators. Furthermore, advantageously, after engagement and coupling, the systems disclosed herein provide for an easy or simple release mechanism, by reversing the engagement operation. Furthermore, advantageously, embodiments of the present disclosure enable selective coupling the elevator car to the building even when there is an offset between the elevator car portions of the platform locking system and the landing portions of the platform locking system. For example, the components of the platform locking systems may include ramps or angled surfaces that are provided to ensure engagement without requiring perfect alignment between the components. Furthermore, the use of hydraulic, pneumatic, or other similar mechanisms allows for passive adjustment of the elements during engagement and coupling, thus enabling automated operation of the coupling and decoupling.

As used herein, the use of the terms “a,” “an,” “the,” and similar references in the context of description (especially in the context of the following claims) are to be construed to cover both the singular and the plural, unless otherwise indicated herein or specifically contradicted by context. The modifier “about” used in connection with a quantity is inclusive of the stated value and has the meaning dictated by the context (e.g., it includes the degree of error associated with measurement of the particular quantity).

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:

an elevator car arranged to travel in an elevator shaft between a plurality of landings; and a platform locking system comprising:

a car portion arranged on the elevator car, the car portion comprising a coupling assembly; and a landing portion arranged at a first landing of the plurality of landings, the landing portion arranged along the elevator shaft and comprising a socket, wherein the coupling assembly is configured to selectively engage with the socket at the first landing to securely couple the elevator car to the elevator shaft, wherein in a coupled state the elevator car is prevented from vertical motion, and wherein the coupling assembly is configured to selectively disengage from the socket at the first landing to decouple the elevator car from the elevator shaft, wherein in a decoupled state the elevator car is free to travel within the elevator shaft, wherein the coupling assembly comprises a hydraulic cylinder assembly having a support arm, a hydraulic cylinder supported at an end of the support arm, and a movable element operably connected to the hydraulic cylinder, wherein the movable element is configured to move in a direction normal to the support arm during coupling and decoupling of the coupling assembly with the socket, and wherein the hydraulic cylinder is inserted into the socket in the coupled state.

2. The elevator system of claim 1, wherein each landing of the plurality of landings comprises a respective landing portion having a respective socket, wherein the coupling assembly of the elevator car is configured to selectively couple and decouple from each of the plurality of sockets.

3. The elevator system of claim 1, wherein the landing portion comprises a plurality of sockets and the car portion comprises a plurality of coupling assemblies, wherein each coupling assembly is configured to selectively couple with a respective socket of the plurality of sockets.

4. The elevator system of claim 1, wherein the socket comprises one or more socket ramps configured to urge at least a part of the coupling assembly into a socket cavity defined by the socket.

5. The elevator system of claim 1, wherein the car portion comprises a support arm, wherein the coupling assembly is arranged at an end of the support arm.

6. The elevator system of claim 5, wherein the support art is movably supported on a mounting bracket, wherein the mounting bracket is securely attached to the elevator car.

7. The elevator system of claim 6, wherein:

the mounting bracket comprises at least one support track; and the support arm comprises at least one roller configured to travel along the at least one support track.

8. The elevator system of claim 5, further comprising a linear actuator configured to selectively drive movement of the support arm to couple or decouple the coupling assembly to or from the socket.

9. The elevator system of claim 1, wherein when the movable element is seated within the socket, the hydraulic cylinder is selectively locked to prevent movement of the movable element.

10. The elevator system of claim 1, wherein the hydraulic cylinder comprises:

a housing;

a piston arranged within the housing, and separating the hydraulic cylinder into a first chamber and a second chamber;

a working fluid contained within the first chamber and the second chamber; and a flow path fluidly coupling the first chamber to the second chamber.

11. The elevator system of claim 10, further comprising a flow controller arranged along the flow path, the flow controller configured to selectively control flow between the first chamber and the second chamber.

12. The elevator system of claim 11, wherein the flow controller is configured to prevent flow between the first chamber and the second chamber when the movable element is seated within the socket.

13. The elevator system of claim 1, wherein the movable element comprises one or more ramps configured to urge the movable element to seat within the socket.

14. The elevator system of claim 1, further comprising an elevator controller, wherein the elevator controller is configured to selectively control operation of the platform locking system.

15. The elevator system of claim 1, further comprising at least one sensor assembly arranged to detect engagement between the car portion and the landing portion.

16. The elevator system of claim 1, further comprising at least one sensor assembly arranged to detect proximity of the car portion and the landing portion.

17. The elevator system of claim 1, further comprising at least one sensor assembly arranged to monitor a hydraulic pressure within the platform locking system.

18. The elevator system of claim 1, wherein:

the car portion is arranged on a bottom of the elevator car below a car sill; and the landing portion is arranged beneath a landing sill of the first landing.

19. A method of operating an elevator system, the elevator system comprising an elevator car, at least one landing, and a platform locking system having a car portion comprising a coupling assembly on the elevator car and a landing portion comprising a socket at the at least one landing, wherein the coupling assembly comprises a hydraulic cylinder assembly having a support arm, a hydraulic cylinder supported at an end of the support arm, and a movable element operably connected to the hydraulic cylinder, wherein the movable element is configured to move in a direction normal to the support arm during coupling and decoupling of the coupling assembly with the socket, and wherein the hydraulic cylinder is inserted into the socket in the coupled state, the method comprising:

moving the elevator car to the at least one landing;

deploying the hydraulic cylinder to engage with the socket of the landing portion;

engaging the coupling assembly into a fixed coupling with the socket;

disengaging the coupling assembly from the fixed coupling with the socket; and retracting the hydraulic cylinder from the socket.

20. The method of claim 19, further comprising controlling a flow of fluid between a first chamber and a second chamber of the hydraulic cylinder to selectively engage and disengage the hydraulic cylinder with the socket.

* * * * *